April 4, 1939. J. G. FULLER 2,152,798
METHOD OF MAKING COMPOSITE PAVEMENTS
Filed Aug. 28, 1936
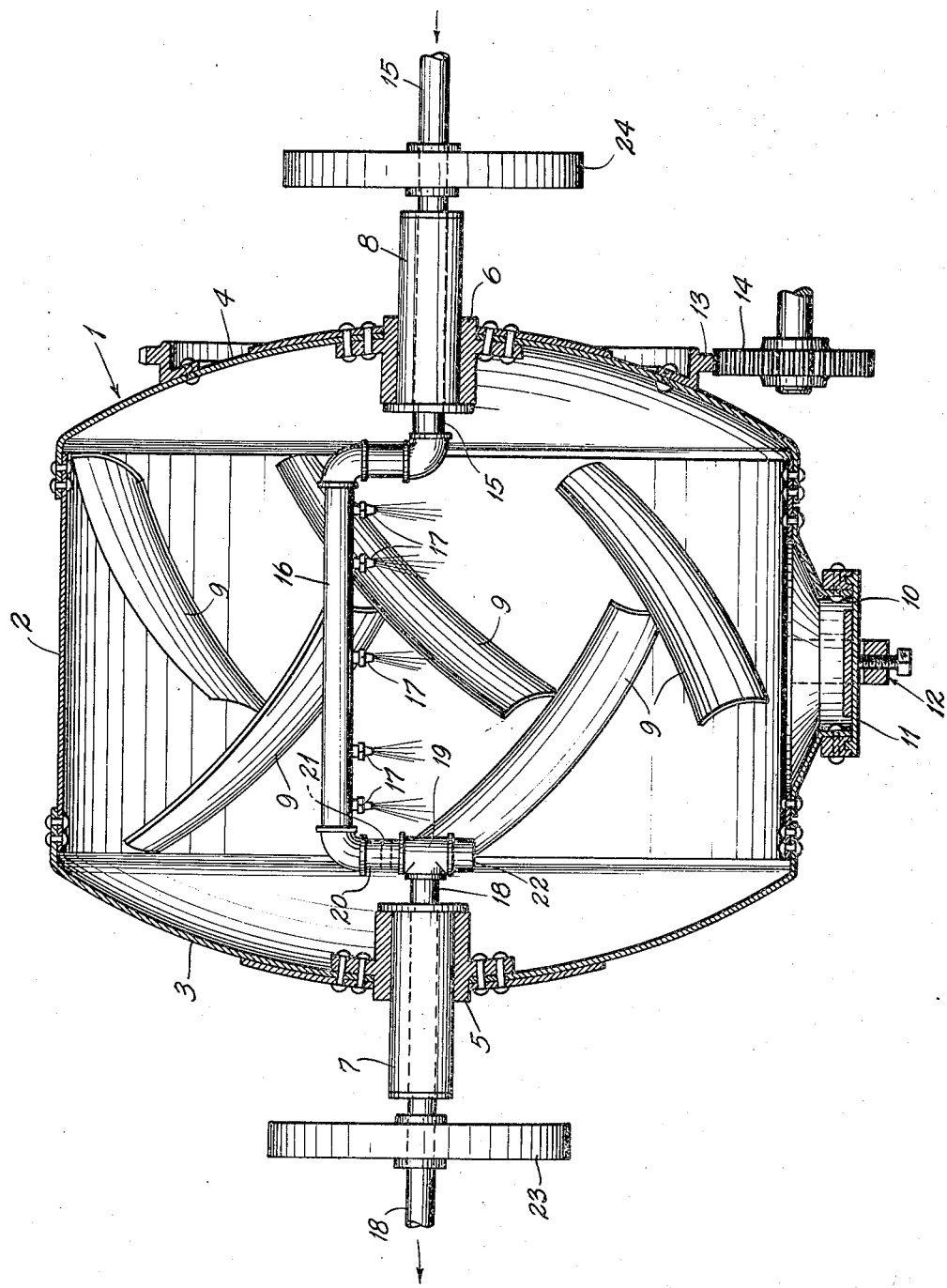
INVENTOR:
JAMES G. FULLER,
BY Laurence C. Kingsland
ATTORNEY.

Patented Apr. 4, 1939

2,152,798

UNITED STATES PATENT OFFICE 2,152,798

METHOD OF MAKING COMPOSITE PAVEMENTS

James G. Fuller, Chicago, Ill., assignor to National Fin-Mix Corporation, St. Louis, Mo., a corporation of Illinois Application August 28, 1936, Serial No. 98,313

4 Claims. (Cl. 106—31)

The present invention provides a novel and advantageous method of securing a composite pavement formed of mineral aggregate coated with a fusible protective coating and binding material. It is particularly applicable to asphaltic pavement formed of such mineral aggregate coated with bitumen.

Heretofore, efforts have been made with some degree of success to form such a paving material wherein the aggregate is distributed homogeneously and each individual particle thereof is completely and evenly covered with the coating, and preferably is impregnated thereby.

The present invention comprises an improvement on such paving material and the method of obtaining the same.

In brief, the invention comprises the selection of suitable mineral aggregate made up of varying sized particles; suitably mixing them so that any increment of the mass thereof will have its proportional share of each size; supplying to the thus mixed aggregate a coating of bitumen so that each individual particle is completely covered; and finally forcing the bitumen into the pores and crevices of the aggregate particles; such steps being carried out in the presence of and by a suitable medium that will not alter the physical properties, principally penetrability and ductility, of the bitumen.

It is an object, therefore, of the invention to provide a unified process for making asphalt paving wherein the final product is entirely homogeneous in composition; and wherein the bitumen is produced, applied, mixed, and even caused to impregnate the aggregate without changing the physical properties thereof.

It is a further object of the invention to provide a process involving the mixing of mineral aggregate with an oxidizable binder in the presence of superheated steam.

It is a further object of the invention to provide a process for causing impregnation of the mineral aggregate by the binder in such wise as to avoid oxidation of the latter.

It is a further object of the invention to provide the impregnation aforesaid by steam in such wise as to prevent emulsifying of the mixture.

The drawing represents the cross-section of a mechanism suitable for carrying out the process.

This mechanism comprises essentially a rotary drum sealed to prevent escape of pressure and provided with means for introducing liquid or gas within the drum during its rotation.

This mechanism in detail comprises the drum 1, this drum having a cylindrical center portion 2 and opposite end closures 3 and 4 that are domed for structural reasons. At the centers of the closures are suitable bearings 5 and 6 whereby the drum is supported on fixed shafts 7 and 8, it being understood that suitable means to render the bearings airtight are provided. On the inner surface of the cylindrical portion 2 are angularly arranged blades 9. At one portion also on the cylindrical portion 2 is provided an opening 10 having an airtight closure 11 held in place by suitable means, such as 12. When the closure 11 is removed, the aggregate may be removed from or introduced into the interior of the drum through the opening 10.

A gear 13 is fixed to the end closure 4 and meshes with a suitable driving gear 14 driven from a source of power.

Extending through the shaft 8 is a pipe 15, the pipe communicating with a header 16 offset from the axis of the drum, as shown. Projecting downwardly from the header 16 are spray nozzles 17, these spray nozzles being suitably distributed along the header for purposes to be described.

A pipe 18 extends through the bearing 7 and terminates in a T 19 to which one end of the header 16 is connected for rigidity and support. A connector 20 plugged as at 21 holds the header 16 to the T 19 but prevents communication therebetween. An outlet 22 is secured to the lower part of the T 19. The members 23 and 24 are fly wheels.

The process is practiced as follows:

A mineral aggregate is selected and, in the usual composition, it embodies due proportions of rocks and sand of different sizes. The mass of aggregate is heated, and the undistributed proportions thereof are then placed within the drum through the opening 10, and the closure 11 is installed. Of course, for filling, the drum will be rotated from the position shown in the drawing so that the opening is at the top side. With the closure tightly fixed in position the drum is rotated with the aggregate inside. The blades 9 cause the material to be shifted from side to side and to roll over upon itself until it is completely and homogeneously mixed. Stated differently, it is mixed until any increment selected from the mass will have the same proportions of all the several sizes of aggregate as any other increment. No loss of aggregate occurs during this mixing because of the fact that the drum is closed.

After the aggregate has thus been mixed a sufficient length of time to effect the proper distribution, the air in the drum may be discharged through the pipe 18, preferably by the application of a non-oxidizing gas through the pipe 15. When the atmosphere within the drum is non-oxidizing, the valves controlling the pipes 15 and 18 may be closed. As a suitable non-oxidizing gas, steam has the advantages of ready availability and cheapness. The steam may be superheated, since in that state it will not condense on the aggregate or drum and foam in the mixing, or form a film on the aggregate particles that will resist adhesion of the binder thereto.

The binder, usually a bitumen, asphaltic cement, is then forced into the header 16 through the pipe 15, and is sprayed into the drum through the nozzles 17. The pressure against the binder is produced by steam, as will be noted. The effect of the spray nozzles, as shown, is to provide a completely distributed and fine sheet of bitumen extending toward the wall of the cylinder. During this time, the cylinder is rotated and the particles of aggregate are being exposed by the action of the drum and the blade 9 during such rotation. Since the spray is very fine, it imparts to each exposed particle of aggregate a thin coating of bitumen, and in so doing, by its force, displaces any gas films that surround such particles. This coating is made more effective by the fact that the finest particles of aggregate may be in suspension in the air of the drum, as likewise may be fine particles of bitumen so that they come in contact with each of them. As the drum continues to rotate, each particle may be brought several times within the direct field of the spraying bitumen until the particles are evenly covered by a complete coat.

Owing to the fact that the bitumen is at this time liquid, and because it presents a very large surface area, oxidation could easily occur if the atmosphere surrounding were air. Either of these factors contributes to the oxidation effect. The presence of the non-oxidizing atmosphere, as set forth, prevents the oxidation, the result of which would be to reduce the ductility and penetration of the binder in the final pavement.

As has been noted, it is desirable also to cause the binder to impregnate the aggregate by penetration into the pores or crevices of the aggregate particles. This may be effected by following the application of the binder by that of a non-oxidizing gas under pressure. As has been stated, the binder is forced into the drum by application of steam pressure. The quantity of binder is predetermined by the design of the pavement, but should be of such quantity, at least, as will cover each particle of aggregate. The gas is applied to this supply until it is all deposited into the drum, after which the steam itself is admitted through the nozzles until the pressure in the drum is raised to such a point that the binder will be forced into the pores or crevices of the aggregate particles. Necessarily, this pressure will have to be evaluated according to the temperature conditions of the material, and its physical properties. Certain representative values are given hereafter.

Where steam is used, it is desirably superheated, since then it will not condense and form an emulsion with the coated aggregate, or prevent proper adhesion thereof. It is to be observed that the pressure of the first applied steam is not significant, whereas in this impregnation step, it is.

During this step of impregnating, the aggregate is being agitated in the mixer, with two results. Each particle of aggregate is being exposed to the free action of the pressure medium, and the particles are being rolled one upon another so that, if any has excess binder, it will be divided evenly among the others, and none will remain uncoated. Necessarily, during this mixing, the mass cools somewhat, and the binder sets from its liquid state to one less free-flowing.

The pressure step is continued for a suitable length of time, until the mass is fully mixed and distributed, and the desired impregnation effected. The use of steam instead of air under pressure in this step alone is of great significance, since tests have shown a preservation of penetrability and ductility of the asphalt as a result thereof.

At the end of the pressure step, the pipe 18 may be opened to exhaust the pressure in the drum. The closure 11 may be removed and the mass of material unloaded onto a truck. During the ensuing operations, including laying, the exposure of the surfaces of the material is minimized, to reduce oxidation.

For illustrative purposes only, it may be suggested that the total time of mixing including the dry mix may be about five minutes, of which the first two are consumed in mixing the dry aggregate, approximately one for application of the binder, and the remaining two for the final mix, including the pressure step, if used. Since the mixture is effectively performed in this time, it will be evident to those skilled in the art that the process is quicker than those formerly used. The temperature of the aggregate when loaded into the drum may be in the neighborhood of 400° to 500° F. The steam may range from approximately 550° to 750° F. and from sixty to one hundred twenty-five pounds pressure. The final mix as removed from the drum will ordinarily range approximately 300° F.

The result of this use of the non-oxidizing gas, such as steam, in place of air, and the consequent reduction of oxidation, is that the ultimate characteristics of the bitumen (particularly penetrability and ductility) are substantially the same as prior to the time when the material was put in the mix; whereas, ordinarily, as compared with the conditions in the material before it is put in the mix, these characteristics of the binder in the laid pavement may be reduced as much as fifty percent., or more. The impregnation obtained is just as good as that of air. Consequently, by employing this process, a road may be obtained having a much greater degree of flexibility and consequent resistance to wear than has heretofore been secured. Greater adhesion between the aggregate particles results, in addition to the finer wearing qualities of the bitumen itself. The employment of the process likewise gives uniform and homogeneous distribution of the aggregate particles in their various sizes so that the base may properly be formed from the larger particles with the smaller ones duly filling the interstices and all held tightly but resiliently in position by the one unoxidized bituminous binder.

It is to be understood that other non-oxidizing gases could be used in place of steam, or other means for obtaining non-oxidizing atmospheres about the mix. However, the cheapness and ready availability of steam makes it most desirable. The preheating of the aggregate, in addition to its functions of drying the aggregate and maintaining the steam in the superheated state, has the further advantage that, upon cooling, after the mass is removed from the drum, the entrained air inevitably present to some extent within the pores and behind the coating, will contract so as to put a negative pressure behind the fingers of binder within the pores and will tend to hold these fingers therein.

It is further to be understood that the invention is not limited to the particular form of mixer shown, since clearly its principles are applicable to other mechanisms.

What is claimed is:

1. In a method of preparing paving material, the steps of supplying an aggregate free of binder in a container to be mixed, discharging the air from said container and supplying a non-oxidizing gas therein and about the aggregate in its stead, and adding bituminous binding material to said aggregate in said container in the presence of said non-oxidizing atmosphere.

2. In a method of preparing paving material, the steps of supplying an aggregate free of binder in a container to be mixed, causing said aggregate to be heated, providing steam in said container to displace the air therefrom and from about the aggregate, thereafter adding oxidizable binding material to the aggregate in the presence of the steam, and mixing the binder and aggregate.

3. In a method of preparing paving material, the steps of supplying an aggregate free of binder in a container to be mixed, causing said aggregate to be heated, supplying superheated steam in said container to displace the air therefrom and from about the aggregate, adding a bituminous binder to said aggregate in the presence of said steam, and mixing the binder and aggregate in the presence of said steam.

4. In a process of preparing paving material, the steps of mixing aggregate free of binder in a movable closed container, discharging substantially all of the air therefrom to supply a non-oxidizing atmosphere in the container and about the aggregate, thereafter spraying an oxidizable binder into said container against the particles of aggregate while they are moved in the container, and applying a pressure by said non-oxidizing atmosphere to said binder to cause the same to penetrate the pores of the aggregate.

JAMES G. FULLER.